United States Patent
Palvölgyi

(10) Patent No.: US 6,685,045 B1
(45) Date of Patent: Feb. 3, 2004

(54) PLUG FOR SEALING A FILLER NECK OF A FUEL TANK

(75) Inventor: Sandor Palvölgyi, Gleisdorf (AT)

(73) Assignee: Tesma Motoren und Getriebetechnik GmbH, Gleisdorf (AT)

( * ) Notice: Subject to any disclaimer, the term of this patent is extended or adjusted under 35 U.S.C. 154(b) by 0 days.

(21) Appl. No.: 09/658,441

(22) Filed: Sep. 8, 2000

(30) Foreign Application Priority Data

Sep. 8, 1999 (AT) .............................................. 610/99 U

(51) Int. Cl.[7] .............................................. B65D 53/00
(52) U.S. Cl. .............................. 220/304; 220/DIG. 33; 220/86.1; 220/86.2; 220/288
(58) Field of Search ................................. 220/304, 378, 220/86.1, 86.2, DIG. 33, 288, 293, DIG. 32; 277/910, 603

(56) References Cited

U.S. PATENT DOCUMENTS

| | | | |
|---|---|---|---|
| 2,684,779 A | * 7/1954 | Rafferty | |
| 2,873,878 A | * 2/1959 | Wolf et al. | 220/378 |
| 2,893,590 A | * 7/1959 | Buckley | |
| 3,053,408 A | * 9/1962 | Rodgers | |
| 4,359,111 A | * 11/1982 | Gonzalez | |
| 4,465,201 A | * 8/1984 | Chalfant, Jr. | |
| 4,575,136 A | * 3/1986 | Keller | 220/DIG. 33 |
| 4,582,328 A | * 4/1986 | Howarth | |
| 4,690,293 A | * 9/1987 | Uranishi et al. | |
| 4,739,899 A | * 4/1988 | Thompson et al. | 220/378 |
| 5,036,996 A | * 8/1991 | Epstein | |
| 5,071,020 A | * 12/1991 | Reutter | 220/DIG. 32 |
| 5,145,008 A | * 9/1992 | Yun | 277/910 |
| 5,374,484 A | * 12/1994 | Kasahara et al. | |
| 6,003,709 A | * 12/1999 | Hagano et al. | |
| 6,056,140 A | * 5/2000 | Muth et al. | 220/DIG. 33 |
| 6,073,791 A | * 6/2000 | Reutter | 220/DIG. 32 |

FOREIGN PATENT DOCUMENTS

| | | |
|---|---|---|
| AT | 004 061 U1 | 9/1999 |
| DE | 900 906 | 7/1939 |
| DE | 27 31 886 A1 | 7/1978 |
| DE | 29 38 629 A1 | 4/1980 |
| DE | 39 18 457 A1 | 12/1989 |
| DE | 195 01 797 A1 | 7/1996 |
| DE | 196 45 173 C1 | 4/1998 |
| DE | 198 45 176 A1 | 4/2000 |
| DE | 198 46 498 A1 | 4/2000 |
| DE | 100 42 640 A1 | 5/2001 |

\* cited by examiner

Primary Examiner—Robin A. Hylton
(74) Attorney, Agent, or Firm—Clark Hill PLC

(57) ABSTRACT

A plug (2) for sealing a filler neck (1) of a fuel tank has a cap (3) which is dismountably attached to the end (5) of the filler neck using a thread (4) or bayonet, and a seal (6) whose sealing surface (7) faces a counter-sealing surface (8) of the filler neck, whereby a ring-shaped molding (9) is provided between the sealing surface and the counter-sealing surface. In order to minimize the amount of permeation, a sealing ring (10) outside of the molding (9) is provided, the sealing ring being made of an elastomer with high resistance to permeation, and the sealing surface (7) and the counter-sealing surface (8) create a narrow gap (20) on the sealing ring (10) side facing the molding (9), this gap extending to the sealing ring (10).

5 Claims, 2 Drawing Sheets

PLUG FOR SEALING A FILLER NECK OF A FUEL TANK

FIELD OF THE INVENTION

The invention relates to a plug for sealing a filler neck of a fuel tank with a cap which is dismountably attached to the end of the filler neck using a thread or bayonet, and with a sealing ring whose sealing surface faces a counter-sealing surface of the filler neck. A ring-shaped molding is provided between the sealing surface and the counter-sealing surface.

BACKGROUND OF THE INVENTION

Naturally the cap of a fuel tank should be water-tight, especially that of an automobile. In addition, various forms of moldings are known to be found between a filler neck and plug or seal. By turning the cap, these are pressed together through the bayonet or thread and thus seal against leakage of liquid fuel. However, even when both are positioned correctly against the filler neck, there are still fuel vapors escaping. The vapors stream outwards when there is sufficient pressure gradient at the moldings of the sealing and are also diffuse through the sealing.

This diffusion through the sealing is also called permeation. It consists of fuel molecules—either in liquid or gas state—penetrating the sealing at its surface, passing through the sealing and exiting at the surface to the outside world. In liquid a state, the molecular density is higher and the number of diffusing molecules larger (at the same temperate).

The general developing trend in the automotive industry tends towards decreasing emissions. For this reason, emissions by permeation are also being increasingly limited by law. Recently, the permeation rate is supposed to be limited to 3 milligrams of hydrocarbon per every 24 hours. This cannot be achieved with any molding, no matter how thoroughly constructed.

SUMMARY OF THE INVENTION

Thus, the invention is concerned with the task of creating a tank plug in such a way as to be able to adhere to this limitation. The invention achieves this by providing a sealing ring outside of the molding (as viewed from inside of the filler neck), the sealing ring being made of an elastomer with high resistance to permeation. The sealing surface and counter-sealing surfaces between the filler neck and plug create a narrow gap on the sealing ring side facing the molding, this gap extending to the sealing ring.

The addition of a second sealing ring is not merely a simple doubling. The molding ring protects the additional sealing ring from coming into contact with liquid fuel and consequently can be used as a vapor seal. For this, a material of high resistance to permeation can be chosen which is possibly less suitable for water sealants. At the same time, the gap reaching up to the sealing ring has yet another effect. It reduces the contact surface between the sealing ring and the fuel vapor to a minimum. Since the amount of diffusion is proportional to the contact surface, permeation is thus further reduced to a fraction of the amount.

Continuing along further with the idea of the invention, the sealing surface and the counter-sealing surface create an enlarged vapor chamber between the gap and the molding. This vapor chamber serves as a stabilizer chamber in which a stoppage of the fuel vapor flowing by the molding occurs. Thus, in the narrow gap directly before the sealing ring, a predominantly stream-free dead area is created in which the vapor concentration close to the sealing ring decreases so that even less vapor can diffuse into it.

An especially advantageous and easy to install arrangement of the sealing rings is achieved by having the sealing surface and counter-sealing surface created (at least partially) conically inwards. Also, this improves centering and preserves the molding, thus making the latter water-tight for a longer time.

In a preferred construction of the invention, the seal can be turned together with the cap yet is connected with it in such a way as to prevent them from falling apart. This prevents the seals from rubbing against the counter surface under pressure, when the seal is turned shut, which would cause wear to the seals.

In order to preserve and maintain the functionality of the sealing rings, it is especially advantageous if the upper end of the cap has a handle which is connected to the cap via a torque-limiting ratchet mechanism.

A further contribution to the sealing's preservation consists of providing a ring-shaped lip seal at the bottom end of the cap which, together with a neck at the circumference of the filler neck, give a sealing effect. Thus, outside caked dirt is kept away from the sealing ring and molding. Finally, the sealing ring is preferably made of a fluorelastomer.

DESCRIPTION OF THE DRAWING

Other advantages of the present invention will be readily appreciated as the same becomes better understood by reference to the following detailed description when considered in connection with the accompanying drawings wherein.

DESCRIPTION OF THE INVENTION

Figure 1:
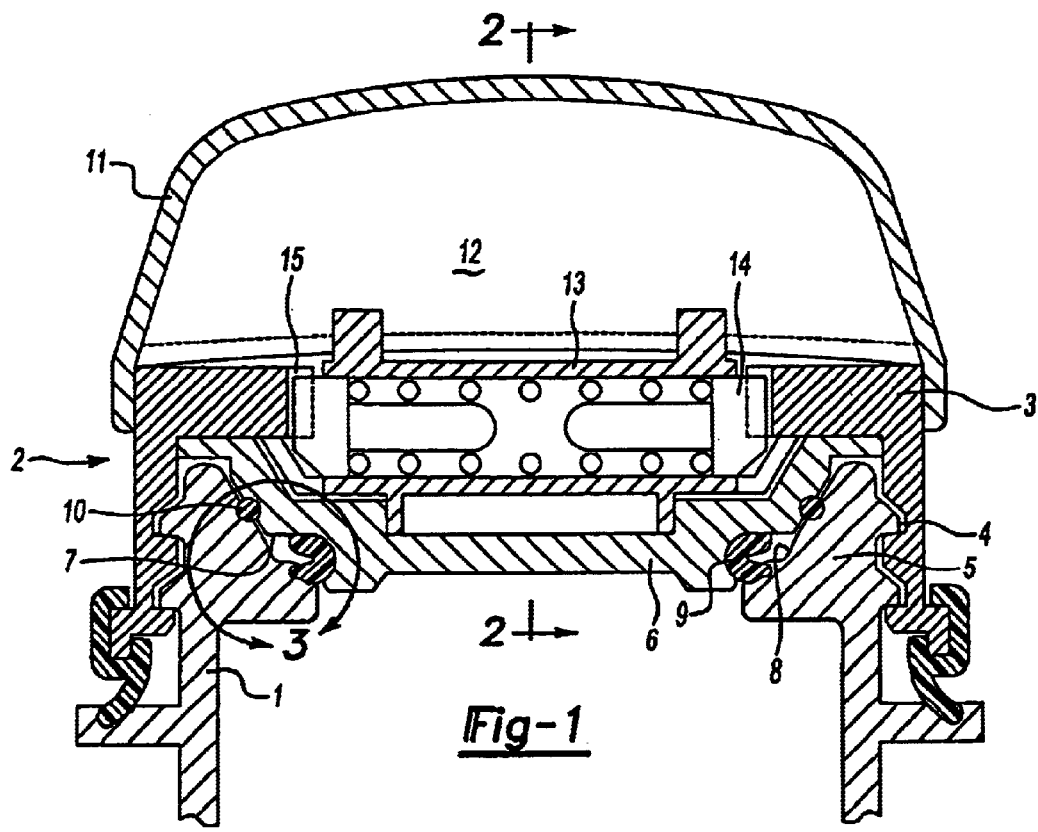
FIG. 1 is a cross-sectional view of a plug according to the invention in vertical section.

In FIG. 1, only the upper part of the filler neck is represented and designated by 1, while 2 stands for the plug which is closing it. The plug 2 includes a pot-shaped cap 3 which in this figure clasps the filler neck 2 outside and is screwed to it via a thread 4 or a bayonet. The thread 4 screw in at the thicker upper end 5 of the filler neck 1. On the inside of the cap 3, a seal 6 is arranged by means of connection, e.g. clips, retaining ring or similar, not shown. On the seal 6, a sealing surface 7 is provided which has a general conical shape. It functions together with a conical counter-sealing surface 8 at the upper end 5 of the filler neck 1. Between the sealing surface 7 and the counter-sealing surface 8, a molding ring 9 is provided which is made of a fuel-resistant elastomer with good low temperature elasticity.

Additionally, another sealing ring 10 is arranged between the sealing surface 7 and the counter-sealing surface 8 (as viewed from inside of the filler neck) outside of the molding 9, that is, between the molding 9 and the open end of the filler neck 1. The sealing ring 10 consists of a fluorelastomer or other material with multiple vapor retaining layers. The sealing ring 10 will be mentioned again later.

Figure 2:
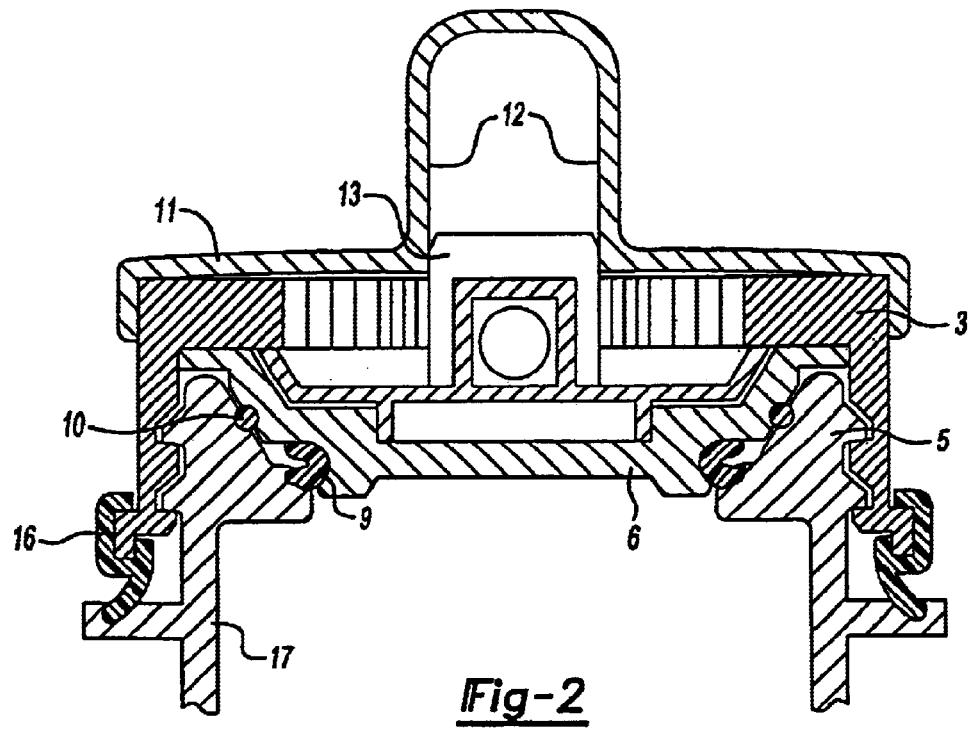
FIG. 2 is a cross-sectional view taken along line 2—2 in FIG. 1.

A handle 11 is attached to the upper end of the cap 3, whose working surfaces 12 are connected to the cap via a ratchet mechanism 13 including ratchet teeth 14 and counter teeth 15 in the cap 3 in such a way that the ratchet teeth 14 are pressed inwards when a certain torque is reached. Thus, the screwing connection between handle 11 and cap 3 is blocked. This way it is ensured that molding ring 9 and sealing ring 10 are not excessively compressed. In FIG. 2, one can also see a ring-shaped lip seal 16 at the bottom end of the cap 3 which functions together with an external neck 17 on the filler neck 1 in order to protect the thread 4, molding 9 and sealing ring 10 from caked dirt.

Figure 3:
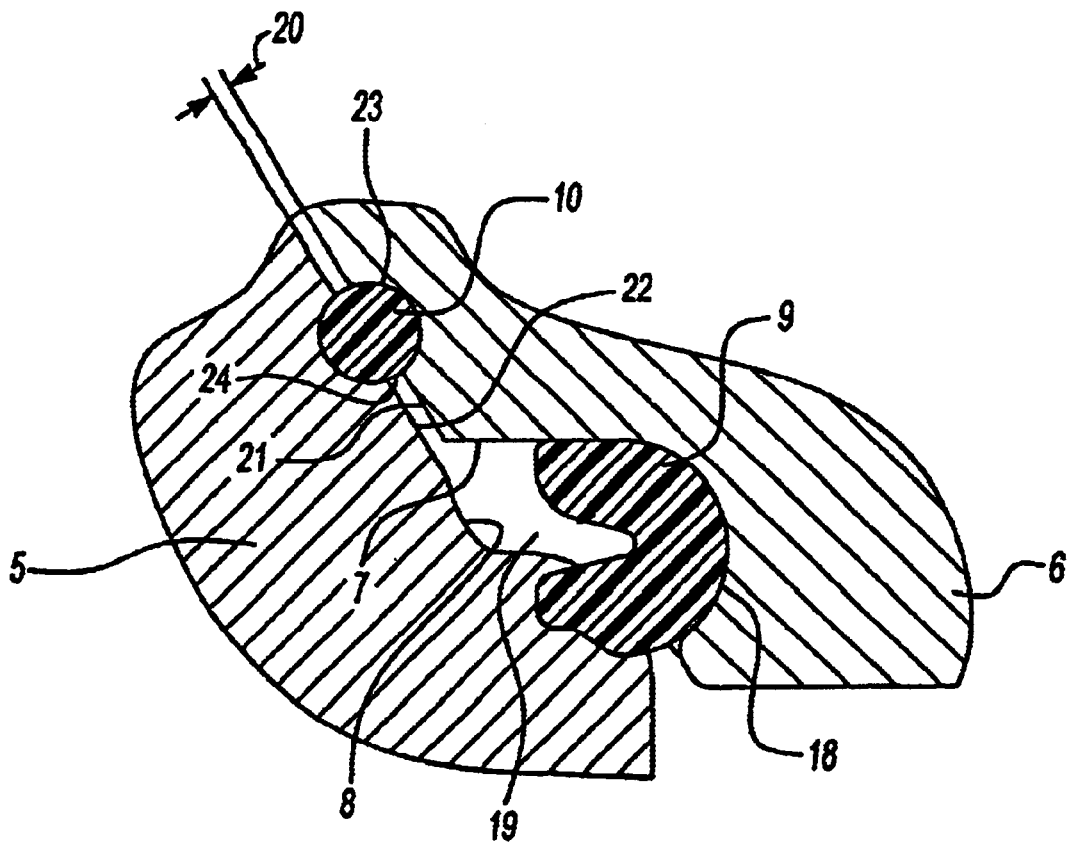
FIG. 3 is an enlarged view of detail 3 in FIG. 1.

FIG. 3 shows the molding 9, the sealing ring 10 and their mutual effects in detail. The seal 6 has a sealing surface 7. In general, it is conical and contains a ring-shaped indentation 18 underneath which accommodates the molding 9. At the upper end 5 of the filler neck 1, a counter-sealing surface 8 is formed which is for the most part also conical. For clarity's sake, the molding 9 and the sealing ring 10 are not represented in a pressed-together state. In reality, they are pressed together by the counter-sealing surface 8 so that they snug with it. Adjacent to the molding 9, a ring-shaped vapor chamber 19 exists whose relatively large volume makes it a stabilizer chamber. Next to it are the sealing surface 7 and the counter-sealing surface 8 whose surface parts are designated by 21, 22. They are strictly conical and create a narrow gap 20 there between which reaches closely up to the sealing ring 10 which in turn is situated in a ring groove 23. The gap width of the gap 20 amounts to only about a tenth of a millimeter. According to state-of-the-art technology, since the gap width of sealing rings amounts to about three millimeters, the contact surface 24 which the sealing ring 10 exposes to the fuel vapor amounts only about one-thirtieth.

The effect of the described sealing arrangement consists of keeping the liquid fuel from the molding 9. Fuel vapors which escape the molding 9, as well as fuel molecules which diffuse through the molding 9 and collect in the vapor chamber 19 and stagnate there, are also kept from the molding 9. However, the vapor chamber 19 itself is not absolutely necessary. The narrow gap 20, which leads up to the sealing ring 10, is adjacent to the vapor chamber 19 or directly adjacent to the molding 9. This gap is so small that no flow can be created in it and the contact surface of the molecules with the seal is only very small. The very small amounts of fuel vapor which initially diffuse through the sealing ring 10 lead to a reduction in the stationary vapor mixture within the narrow gap 20 so that in the most favorable case, the penetration is finally stopped completely.

The above-described embodiment of the invention is intended to be an example of the present invention and alterations and modifications may be effected thereto, by those of ordinary skill in the art, without departing from the scope of the invention.

What is claimed is:

1. A combination plug and filler neck for sealing a filler neck of a fuel tank comprising:

a filler neck having an upper end and a conically shaped counter-sealing surface defining a fluid opening into said filler neck;

a cap for removably attaching said plug to said upper end of said filler neck;

a seal coupled to said cap for plugging said fluid opening in said filler neck, said seal having a conically shaped sealing surface complementary to said counter-sealing surface of said filler neck;

a molding ring supported by said seal for engaging between said sealing surface and said counter-sealing surface of said filler neck and providing an impervious seal therebetween;

a sealing ring supported by said seal and spaced from said molding ring for engaging between said sealing surface and said counter-sealing surface of said filler neck and maintaining a space between said sealing surface of said seal and said counter-sealing surface of said filler neck defining a gap therebetween to provide an additional impervious seal between said plug and filler neck;

said seal including a ring-shaped indentation for supporting said molding ring and a ring-shaped grove spaced from said ring-shaped indentation for supporting said sealing ring;

a ring-shaped lip seal secured to said cap for engaging with the external portion of said filler neck and creating an impervious seal therebetween to prevent exposure to said sealing ring and said molding;

said counter-scaling surface of said filler neck and said sealing surface of said seal forming an enlarged ring-shaped vapor chamber between the sealing ring and the molding ring, and said gap interconnecting with said vapor chamber, wherein said vapor chamber has a volume larger than the volume of said gap and said gap exposes a contact surface on a portion of the sealing ring facing said vapor chamber between said counter-sealing surface of said filler neck and said sealing surface of said seal to create a stabilizing chamber between said molding ring and said sealing ring to minimize fluid permeation therefrom.

2. The combination as set forth in claim 1 further including a handle coupled to said cap for rotatably attaching said plug to said filler neck.

3. The combination as set forth in claim 2 further including a torque limiting ratchet mechanism coupled between said handle and said cap for controlling the amount of compression of said sealing ring and said molding ring when said plug is secured to said filler neck.

4. The combination as set forth in claim 3 wherein said cap includes a plurality of threads for engaging with a plurality of cooperative threads on said filler neck to removably attach said plug to said filler neck.

5. The combination as set forth in claim 4 wherein said sealing plug is made of a fluorelastomer.

* * * * *